United States Patent
Lee et al.

(10) Patent No.: US 9,039,221 B2
(45) Date of Patent: *May 26, 2015

(54) BACKLIGHT UNIT AND DISPLAY APPARATUS USING THE SAME

(71) Applicant: LG Innotek Co., Ltd., Seoul (KR)

(72) Inventors: Jung Ho Lee, Seoul (KR); Sung Yong Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/151,928

(22) Filed: Jan. 10, 2014

(65) Prior Publication Data
US 2014/0126184 A1 May 8, 2014

Related U.S. Application Data

(63) Continuation of application No. 13/370,546, filed on Feb. 10, 2012, now Pat. No. 8,646,929.

(30) Foreign Application Priority Data

Jun. 30, 2011 (KR) .................. 10-2011-0064748

(51) Int. Cl.
*G02F 1/13357* (2006.01)
*F21V 7/09* (2006.01)
(Continued)

(52) U.S. Cl.
CPC . *F21V 7/00* (2013.01); *F21V 15/01* (2013.01); *G02F 1/133605* (2013.01);
(Continued)

(58) Field of Classification Search
CPC .. G02B 6/0051; G02B 6/0086; G02B 6/0088; G02B 6/0096; F21V 7/00; F21V 7/005; F21V 7/09; F21V 15/00; F21V 15/01; F21V 15/04; G02F 1/133602; G02F 1/133603; G02F 1/133605; G02F 1/133606; G02F 1/133608; G02F 2001/133607
USPC .......... 362/97.1–97.4, 297, 346, 362; 349/58, 349/61, 62, 67
See application file for complete search history.

(56) References Cited

U.S. PATENT DOCUMENTS 3,643,085 A  2/1972 Durand ........................... 240/20
4,342,072 A  7/1982 Guritz et al. ................... 362/222
(Continued)

FOREIGN PATENT DOCUMENTS

EP  2 476 950 A1  7/2012
JP  2006-147398 A  6/2006

OTHER PUBLICATIONS

European Search Report dated Oct. 1, 2012 issued in Application No. 12 15 3307.
(Continued)

*Primary Examiner* — Alan Cariaso
(74) *Attorney, Agent, or Firm* — Ked & Associates, LLP

(57) ABSTRACT

Disclosed are a backlight unit and a display apparatus using the same. The backlight unit includes first and second reflectors, a light source module, an optical member spaced apart from the second reflector, a first cover to come into contact with the second reflector and optical member, a second cover coupled to the first cover to support the light source module, and a third cover coupled to the first and second covers. The first cover includes a bottom plate, first lateral plates facing each other with respect to a first direction, second lateral plates facing each other in a second direction, a first coupling portion disposed at each first lateral plate and coupled to the second cover, a second coupling portion disposed at each second lateral plate and coupled to the optical member, and a third coupling portion disposed at each second lateral plate and coupled to the third cover.

20 Claims, 12 Drawing Sheets

(51) Int. Cl.
    *F21V 15/01*     (2006.01)
    *F21V 7/00*     (2006.01)
    *G02F 1/1335*     (2006.01)
    *F21V 8/00*     (2006.01)

(52) U.S. Cl.
    CPC .......... *F21V 7/005* (2013.01); *G02F 1/133608* (2013.01); *G02B 6/0086* (2013.01); *G02B 6/0096* (2013.01); *G02B 6/0051* (2013.01); *G02B 6/0088* (2013.01)

(56) References Cited

U.S. PATENT DOCUMENTS

| | | | |
|---|---|---|---|
| 4,599,684 A | 7/1986 | Lee | 362/346 |
| 6,422,709 B1 | 7/2002 | Panagiotou | 362/16 |
| 7,458,697 B2 * | 12/2008 | Ueda | 362/96 |
| 7,695,182 B2 * | 4/2010 | Iwasaki | 362/633 |
| 7,821,595 B2 | 10/2010 | Ke et al. | 349/58 |
| 8,646,929 B2 * | 2/2014 | Lee et al. | 362/97.1 |
| 2007/0147036 A1 | 6/2007 | Sakai et al. | 362/240 |
| 2008/0158473 A1 * | 7/2008 | Liang | 349/60 |

OTHER PUBLICATIONS

United States Notice of Allowance dated Oct. 7, 2013 issued in U.S. Appl. No. 13/370,546.

* cited by examiner

BACKLIGHT UNIT AND DISPLAY APPARATUS USING THE SAME

CROSS REFERENCE TO RELATED APPLICATIONS

This application is a Continuation Application of prior U.S. patent application Ser. No. 13/370,546 filed Feb. 10, 2012, which claims priority under 35 U.S.C. §119 to Korean Patent Application No. 10-2011-0064748, filed in Korea on Jun. 30, 2011, which are hereby incorporated in their entirety by reference as if fully set forth herein.

TECHNICAL FIELD

Embodiments relate to a backlight unit and a display apparatus using the same.

BACKGROUND

Generally, representative large-scale display apparatuses include Liquid Crystal Displays (LCDs), Plasma display Panels (PDPs), etc.

Unlike self-emission type PDPs, LCDs essentially need a separate backlight unit due to absence of self light emitting devices.

Backlight units for use in LCDs are classified into edge type backlight units and vertical type backlight units according to positions of light sources. In an edge type backlight unit, light sources are arranged at left and right edges or upper and lower edges of an LCD panel and a light guide plate is disposed to uniformly distribute light throughout a surface of the LCD panel, which ensures uniform luminance and enables production of an extremely thin display panel.

A vertical type backlight unit is normally applied to displays of 20 inches or more. The vertical type backlight unit advantageously has greater light efficiency than the edge type backlight unit owing to a plurality of light sources being arranged below a panel and thus, is mainly used in a large-scale display requiring high luminance.

Conventional edge type or vertical type backlight units have adopted Cold Cathode Fluorescent Lamps (CCFL) as a light source.

The backlight units using CCFLs, however, have several disadvantages, such as consumption of a great quantity of power because power should always be applied to a CCFL, low color reproduction efficiency of about 70% that of a Cathode Ray Tube (CRT), and environmental pollution due to use of mercury.

Currently, backlight units using Light Emitting Diodes (LEDs) are being studied as a solution to the above described problems.

In the case of backlight units using LEDs, turning on or off a part of an LED array is possible, which can achieve remarkable reduction in power consumption. In particular, RGB LEDs exhibit color reproduction beyond 100% of a color reproduction range proposed by the National Television System Committee (NTSC) and can provide more vivid images to consumers.

SUMMARY

Embodiments provide a backlight unit having an air guide, which employs a light weight and mass producible cover frame, and a display apparatus using the same.

In one embodiment, a backlight unit includes first and second reflectors, at least one light source module disposed between the first reflector and the second reflector, an optical member disposed at a predetermined distance from the second reflector to define a space between the optical member and the second reflector, a first cover configured to come into contact with the second reflector and the optical member, a second cover coupled to the first cover to support the light source module, and a third cover coupled to both the first and second covers, wherein the first cover includes a bottom plate, first lateral plates disposed to face each other with respect to a first direction of the bottom plate, second lateral plates disposed to face each other in a second direction perpendicular to the first direction, a first coupling portion disposed at a lower portion of each first lateral plate so as to be coupled to the second cover, a second coupling portion disposed at an upper portion of each second lateral plate so as to be coupled to the optical member, and a third coupling portion disposed at a lateral portion of each second lateral plate so as to be coupled to the third cover.

The second coupling portion and the third coupling portion may be arranged to correspond to each other in a one to one ratio.

The second coupling portion may protrude from an upper surface of the second lateral plate, and the third coupling portion may protrude from a lateral surface of the second lateral plate.

The backlight unit may further include a third reflector disposed on an inner surface of each second lateral plate, and a plurality of ribs may be arranged on an outer surface of each second lateral plate.

A height of the second lateral plates may be greater than a height of the first lateral plates.

The first coupling portion may include a plurality of ridge lines protruding from a lower surface of the first lateral plate, and the ridge lines may be spaced apart from one another so as to be arranged in the first direction.

The bottom plate may include at least one inclined surface, and the at least one inclined surface of the bottom plate may include a plurality of inclined surfaces arranged adjacent to each other about at least one inflection point and having different curvatures.

A plurality of pins may be arranged on an upper surface of the bottom plate and a lower surface of each pin may have a greater area than an upper surface of the pin. A plurality of ribs may be arranged on a lower surface of the bottom plate.

The first cover may be formed of a polymer resin, and an air guide may be defined in a space between a bottom surface of the first cover and the optical member.

The second cover may include a fourth coupling portion located at a lower surface of the second cover so as to be coupled to the first cover, and a fifth coupling portion located at a lateral surface of the second cover so as to be coupled to the third cover.

The third cover may include sixth coupling portions located at opposite sides of the third cover so as be spaced apart from one another in the first direction, and seventh coupling portions located at opposite sides of the third cover so as to be spaced apart from one another in the second direction perpendicular to the first direction, the sixth coupling portions may be coupled to the second cover, and the seventh coupling portions may be coupled to the first cover.

The third cover may further include eighth coupling portions arranged at a lower surface of the third cover to correspond to the seventh coupling portions in a one to one ratio, the eighth coupling portions being coupled to the first cover.

BRIEF DESCRIPTION OF THE DRAWINGS

Arrangements and embodiments may be described in detail with reference to the following drawings in which like reference numerals refer to like elements and wherein.

DESCRIPTION OF SPECIFIC EMBODIMENTS

Hereinafter, embodiments will be described with reference to the annexed drawings.

It will be understood that when an element is referred to as being 'on' or 'under' another element, it can be directly on/under the element, and one or more intervening elements may also be present.

Also, when an element is referred to as being 'on' or 'under', 'under the element' as well as 'on the element' can be included based on the element.

Figure 1A:
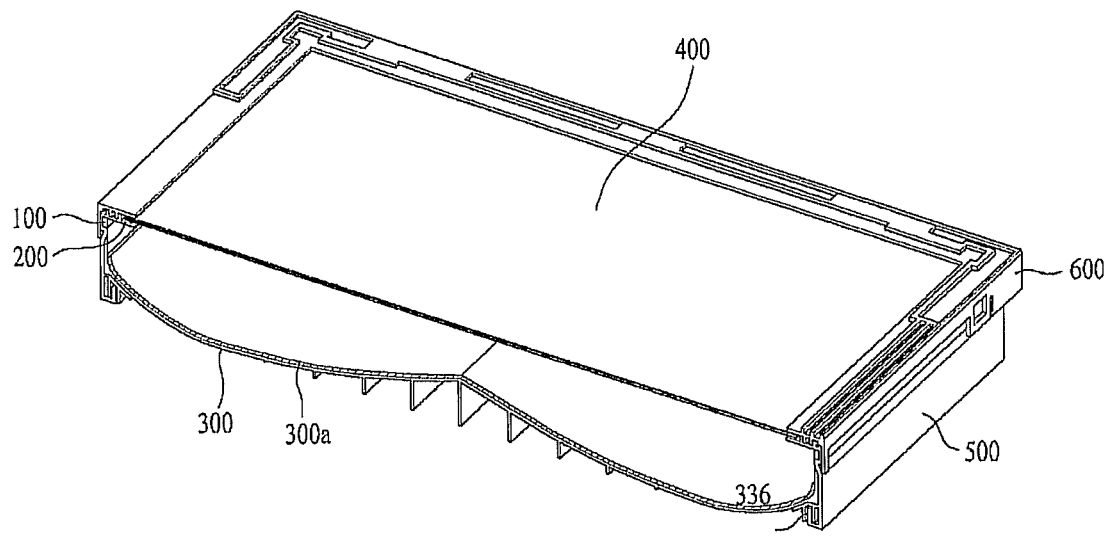
FIGS. 1A to 1C are views explaining a 2-edge type backlight unit according to an embodiment.
Figure 1B:
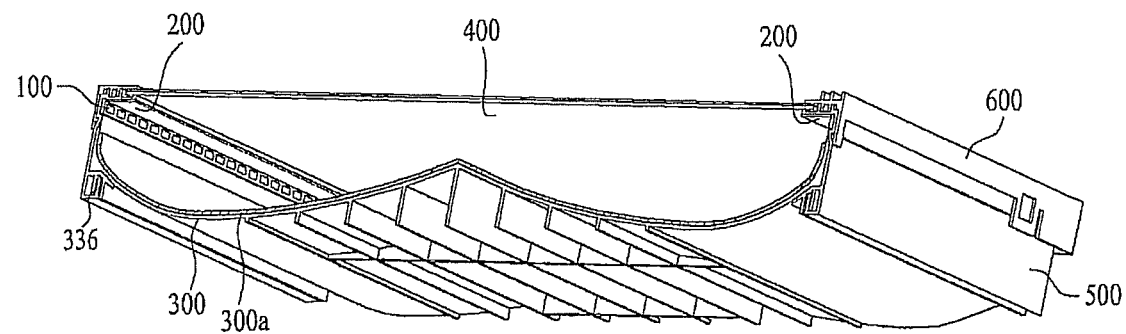
Figure 1C:
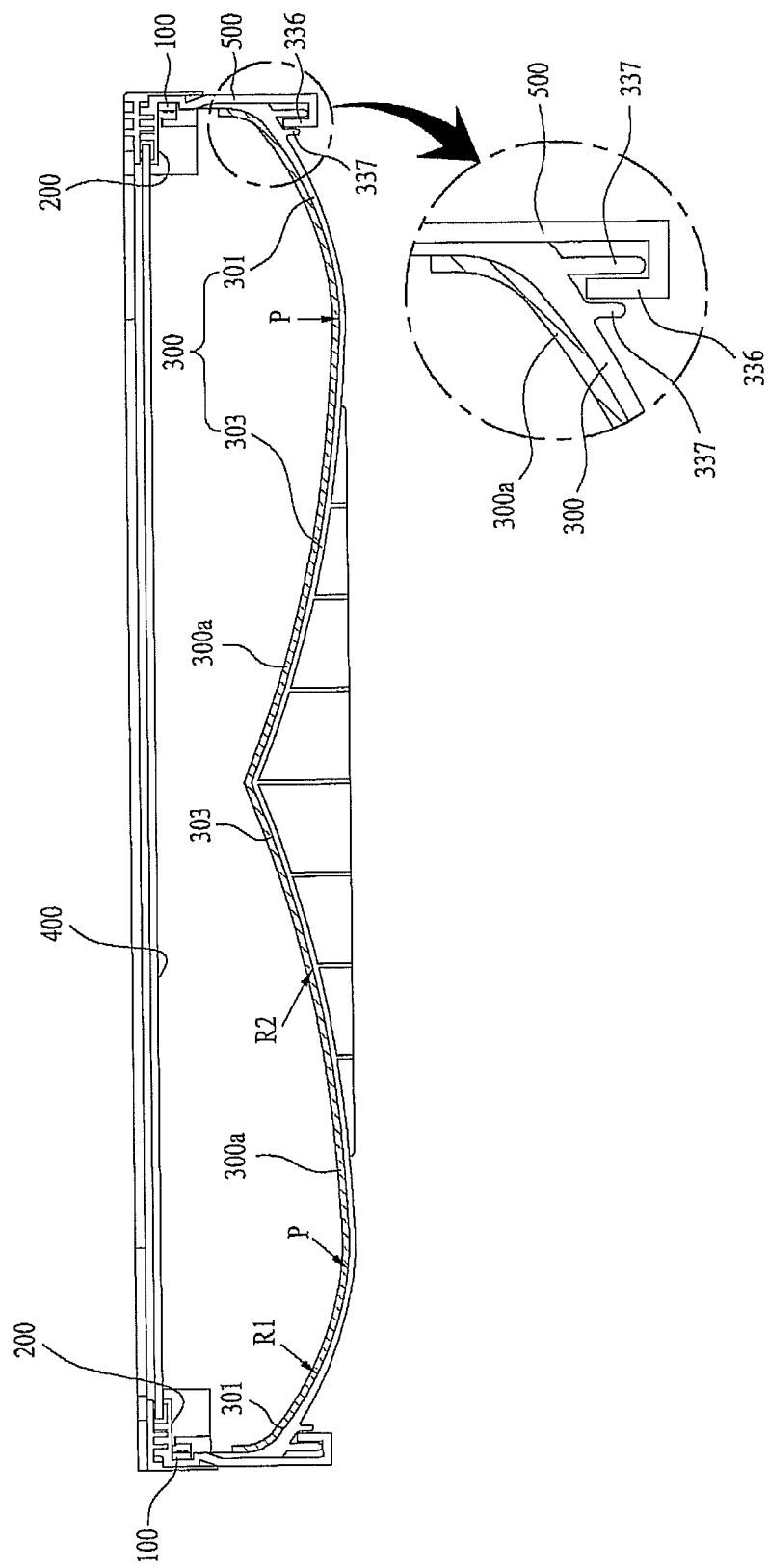

FIGS. 1A to 1C are views explaining a 2-edge type backlight unit according to an embodiment, FIG. 1A being a front perspective view, FIG. 1B being a rear perspective view and FIG. 1C being a cross sectional view.

As illustrated in FIGS. 1A to 1C, the backlight unit may include a light source module 100 including at least one light source, a first cover 300 including a second reflector 300a at an upper surface thereof, a second cover 500 including a first reflector 200, and a third cover 600 coupled to the first and second covers 300 and 500.

The light source module 100 may be located between the first reflector 200 of the second cover 500 and the second reflector 300a of the first cover 300, and may be disposed close to the first reflector 200.

As occasion demands, the light source module 100 may come into contact with the first reflector 200 while being spaced apart from the second reflector 300a of the first cover 300 by a predetermined distance, or may come into contact with the second reflector 300a of the first cover 300 while being spaced apart from the first reflector 200 by a predetermined distance.

Alternatively, the light source module 100 may be spaced apart from both the first reflector 200 and the second reflector 300a by predetermined distances, or may come into contact with both the first reflector 200 and the second reflector 300a.

The light source module 100 may include a board having an electrode pattern and at least one light source disposed on the board.

The light source of the light source module 100 may include top view type light emitting diodes.

As occasion demands, the light source may include side view type light emitting diodes.

The board may be a Printed Circuit Board (PCB), which is formed of any one material selected from among polyethylene terephthalate (PET), glass, polycarbonate (PC) and silicon (Si). In some embodiments, the board may be replaced with a film.

The board may be selected from among a single-layer PCB, a multi-layer PCB, a ceramic board, a metal core PCB and the like.

The board may be disposed with any one of a reflective coating film and a reflective coating material layer and may serve to reflect light emitted from the light source toward the central region of the second reflector 300a.

The light source may be a Light Emitting Diode (LED) chip. The LED chip may be a blue LED chip or ultraviolet LED chip, or may be a package combining at least one or more selected from among a red LED chip, green LED chip, blue LED chip, yellow green LED chip and white LED chip.

A white LED may be realized by coupling a yellow phosphor to a blue LED, by coupling both red and green phosphors to a blue LED, or by coupling yellow, red and green phosphors to a blue LED.

The first reflector 200 and the second reflector 300a may be spaced apart from each other by a predetermined distance so as to face each other, such that an air guide is defined in an empty space between the first reflector 200 of the second cover 500 and the second reflector 300a of the first cover 300.

The first reflector 200 may have an open region, and may come into contact one side of the light source module 100 or may be spaced apart from the light source module 100 by a predetermined distance.

More specifically, the first reflector 200 may have an open central region, and the light source module 100 may include a first light source module and a second light source module arranged at opposite edge regions of the first reflector 200 so as to face each other.

The first reflector 200 may be formed of any one of a reflective coating film and a reflective coating material layer and may serve to reflect light emitted from the light source module 100 toward the second reflector 300a.

A saw-toothed reflective pattern may be formed on a surface of the first reflector 200 facing the light source module 100. The reflective pattern may be flat or may be curved.

Providing the surface of the first reflector 200 with the reflective pattern is to reflect light emitted from the light source module 100 toward the central region of the second reflector 300a, thereby increasing luminance of the central region of the backlight unit.

The first cover 300, which includes the second reflector 300a disposed on the upper surface thereof, may be spaced apart from the light source module 100 by a predetermined distance. The first cover 300 may include an inclined surface, which has a predetermined inclination with respect to a horizontal plane parallel to the surface of the first reflector 200.

The inclined surface of the first cover 300 may serve to reflect light, emitted from the light source module 100 or reflected by the first reflector 200, toward the open region of the first reflector 200.

The first cover 300 may include at least two inclined surfaces having at least one inflection point.

As illustrated in FIG. 1C, first and second inclined surfaces 301 and 303 of the first cover 300 may be adjacent to each other about an inflection point P and may have different curvatures.

The inflection point P between the first and second inclined surfaces 301 and 303 may be located adjacent to the light source module 100.

This is because the curvature of the first inclined surface 301 adjacent to the light source module 100 is greater than the curvature of the second inclined surface 303.

The second reflector 300a, which is disposed on the upper surface of the first cover 300, may take the form of a reflective coating film, or a reflective coating material layer obtained by depositing a reflective material.

The second reflector 300a may contain at least one of a metal and metal oxide. For example, the second reflector 300a may be formed of a metal or metal oxide having high reflectivity, such as aluminum (Al), silver (Ag), gold (Au) or titanium dioxide ($TiO_2$).

In this case, the second reflector 300a may be formed by depositing or coating a metal or metal oxide on the first cover 300, or may be formed by printing reflective ink on the first cover 300.

Here, deposition may be performed by thermal deposition, evaporation, or vacuum deposition such as sputtering, and coating or printing may be performed by gravure coating, silk screen printing, or the like.

Once the second reflector 300a has been prepared in the form of a film or sheet, the second reflector 300a may be attached to the upper surface of the first cover 300.

As occasion demands, the second reflector 300a may be disposed with at least one of a specular reflection sheet and a scattered reflection sheet. The specular-reflection sheet serves to reflect light in a given direction, and the scattered-reflection sheet serves to reflect incident light in several directions.

The second reflector 300a may be formed of a single material. Alternatively, the second reflector 300a may be formed of different two materials and exhibit different surface roughness values with respect to the first and second inclined surfaces 301 and 303 of the first cover 300.

More specifically, the second reflector 300a may be formed of a single material on both the first and second inclined surfaces 301 and 302 of the first cover 300, but may exhibit different surface roughness values with respect to the first and second inclined surfaces 301 and 303.

Alternatively, the second reflector 300a on the first inclined surface 301 and the second reflector 300a on the second inclined surface 302 of the first cover 300 may be formed of different materials and have different surface roughness values.

Additionally, an optical member 400 may be arranged at a predetermined distance from the second reflector 300a of the first cover 300 to define a space therebetween.

An air guide may be defined in the space between the second reflector 300a of the first cover 300 and the optical member 400.

The optical member 400 may have a roughened pattern on an upper surface thereof.

The optical member 400 serves to diffuse light emitted from the light source module 100 and thus, the roughened pattern formed on the upper surface of the optical member 400 may serve to increase light diffusion efficiency.

More specifically, the optical member 400 may be formed in multiple layers, and the roughened pattern may be formed on a surface of an uppermost layer or any one layer.

The roughened pattern may be a stripped pattern aligned in a longitudinal direction of the light source module 100.

In this case, the roughened pattern may be defined by raised portions on the surface of the optical member 400 and each raised portion consists of first and second surfaces, which face each other to define an acute angle or an obtuse angle therebetween.

As occasion demands, the optical member 400 may include at least one sheet selected from among a diffusion sheet, a prism sheet, a luminance increasing sheet and the like.

The diffusion sheet serves to diffuse light emitted from the light source, the prism sheet serves to guide the diffused light to a light emission area, and the luminance increasing sheet serves to increase luminance.

Figure 2A:
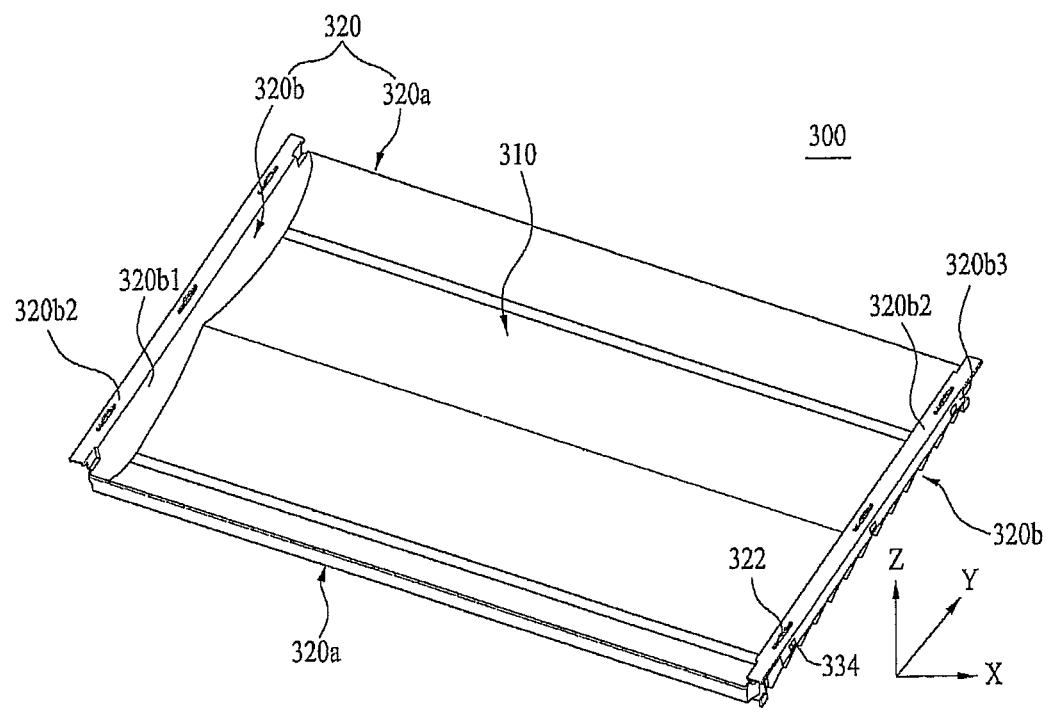
FIGS. 2A and 2B are perspective views illustrating a first cover of FIG. 1C in detail.
Figure 2B:
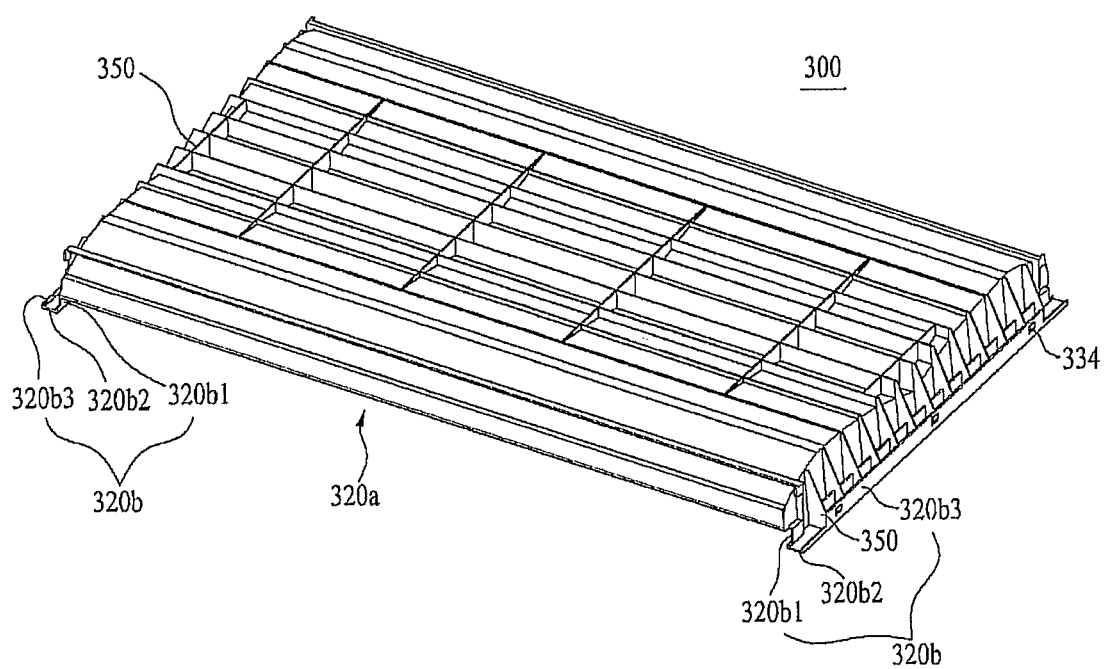

FIGS. 2A and 2B are perspective views illustrating a first cover of FIG. 1C in detail, FIG. 2A being a front perspective view of the first cover, and FIG. 2B being a rear perspective view of the first cover.

Figure 3A:
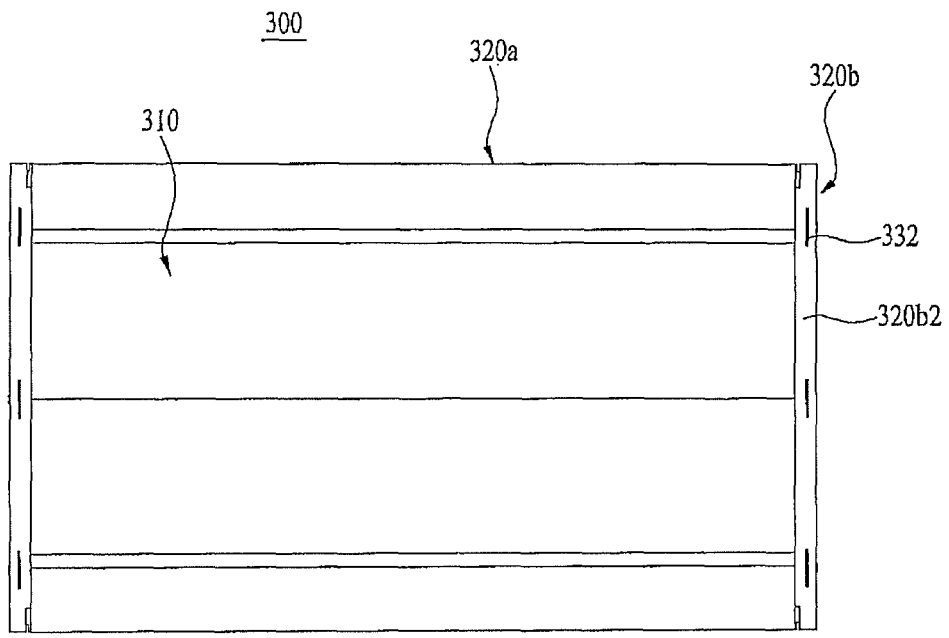
FIGS. 3A to 3C are a plan view and side views illustrating the first cover in detail.
Figure 3B:
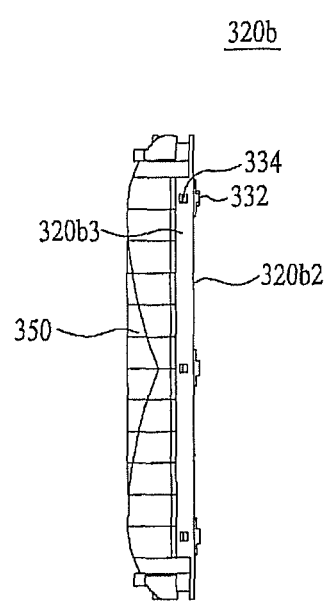
Figure 3C:
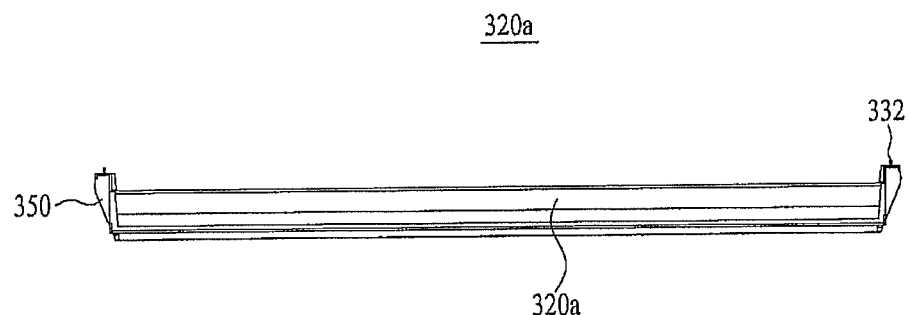

FIGS. 3A to 3C are a plan view and side views illustrating the first cover in detail, FIG. 3A being a plan view, FIG. 3B being a side view of a second lateral plate of the first cover, and FIG. 3C being a side view of a first lateral plate of the first cover.

As illustrated in FIGS. 2A and 2B and FIGS. 3A to 3C, the first cover 300 may include a bottom plate 310 and lateral plates 320.

The lateral plates 320 may include a pair of first lateral plates 320a and a pair of second lateral plates 320b. The first lateral plates 320a are arranged to face each other with respect to a first direction (Y-direction of FIG. 2A) of the bottom plate 310. The second lateral plates 320b are arranged to face each other with respect to a second direction (X-direction of FIG. 2A) perpendicular to the first direction.

The first lateral plate 320a, as illustrated in FIGS. 1A to 1C, may include a first coupling portion 336 for coupling with the second cover 500.

The first coupling portion 336 may be formed at a lower portion of the first lateral plate 320a.

The second lateral plate 320b, as illustrated in FIGS. 1A to 1C, may include second coupling portions 332 for coupling with the optical member 400 and third coupling portions 334 for coupling with the third cover 600.

The second coupling portions 332 may be formed at an upper surface 320b2 of the second lateral plate 320b, and the third coupling portions 334 may be formed at an outer surface 320b3 of the second lateral plate 320b.

The second coupling portions 332 and the third coupling portions 334 may be arranged to correspond to each other in a one to one ratio.

The second coupling portion 332 may protrude upward (in Z-direction of FIG. 2A) from the upper surface 320b2 of the second lateral plate 320b. The third coupling portions 334 may protrude in the second direction (the X-direction of FIG. 2A) from the outer surface 320b3 of the second lateral plate 320b.

Additionally, a third reflector may be disposed on an inner surface 320b1 of the second lateral plate 320b.

The third reflector may be formed of the same material as or a different material than that of the second reflector 300a disposed on the bottom plate 310 and the first lateral plate 320a of the first cover 300.

A plurality of ribs 350 may be arranged on the outer surface 320b3 of the second lateral plate 320b.

The ribs 350 serve to prevent the first cover 300 from being deformed due to external shock.

A height of the second lateral plate 320b may be greater than a height of the first lateral plate 320a.

Since the optical member 400 must be spaced apart from the bottom plate 310 of the first cover 300, the second lateral plate 320b, which supports the optical member 400, must have a greater height than the first lateral plate 320a which does not support the optical member 400.

Referring again to FIG. 1C, the first coupling portion 336 may have a plurality of ridge lines 337 protruding from a lower surface of the first lateral plate 320a.

The ridge lines 337 may be spaced apart from one another and may be arranged in the second direction (the X-direction of FIG. 2A).

The bottom plate 310 may include at least one inclined surface and more particularly, two inclined surfaces with at least one inflection point interposed therebetween. The inclined surfaces at opposite sides of the inflection point may have different curvatures.

Figure 4:
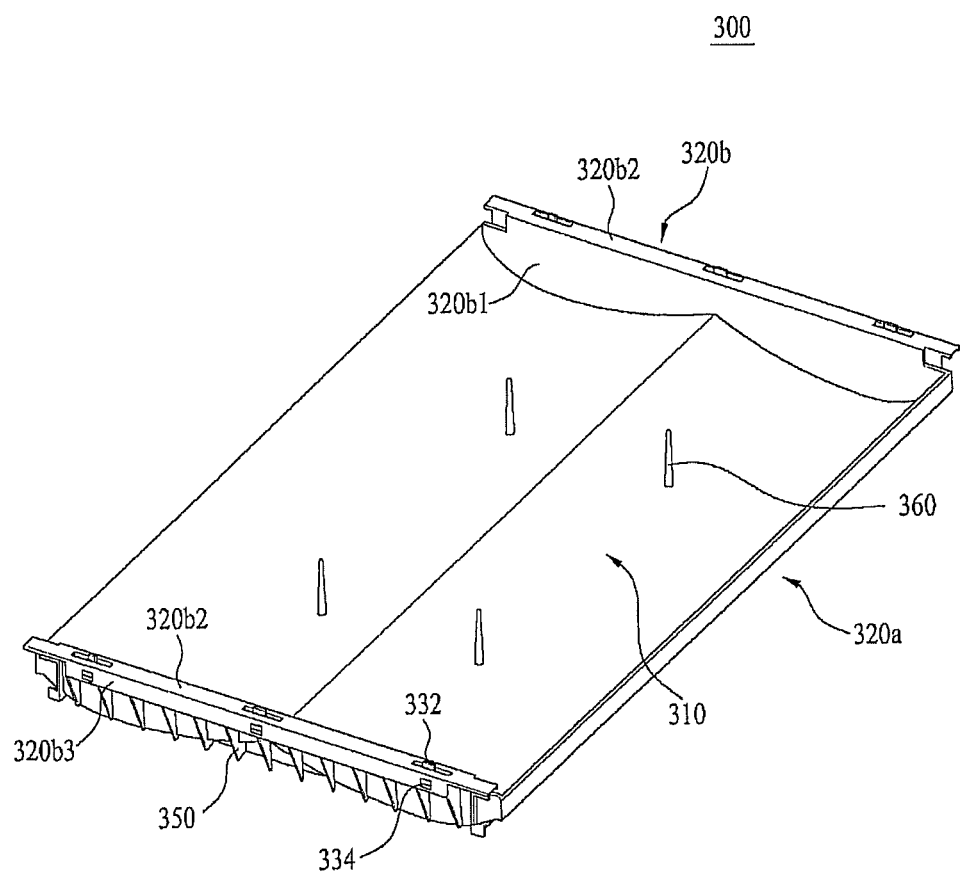
FIG. 4 is a perspective view illustrating pins arranged on the first cover.

FIG. 4 is a perspective view illustrating pins arranged on the first cover.

As illustrated in FIG. 4, a plurality of pins 360 may be arranged on an upper surface of the bottom plate 310 and may be configured in such a way that a lower surface of each pin 360 has a greater area than an upper surface of the pin 360.

The optical member 400, which is spaced apart from the second reflector 300a of the first cover 300 to define an air guide therebetween, is liable to sag. Therefore, the pins 360 serve to support the optical member 400.

To provide the pins 360 with a stabilized configuration, the lower surface of the pin 360, which comes into contact with the second reflector 300a, may have a greater area than the upper surface of the pin 360.

As illustrated in FIG. 2B, a plurality of reinforcing ribs 350 may be additionally arranged at a lower surface of the bottom plate 310.

The bottom plate 310 of the first cover 300 is curved and may be easily deformed by external shock. The ribs 350 may serve to prevent deformation of the bottom plate 310.

The first cover 300 having the above described configuration may be formed of a polymer resin suitable for injection molding.

For example, the first cover 300 may be formed of at least one selected from among unsaturated polyester, methyl methacrylate, ethyl methacrylate, isobutyl methacrylate, N-butyl methacrylate, acrylic acid, methacrylic acid, hydroxyl ethyl methacrylate, hydroxyl propyl methacrylate, hydroxyl ethyl acrylate, acrylamide, ethyl acrylate, isobutyl acrylate, and N-butyl acrylate.

The second reflector 300a may be disposed over the bottom plate 310 and the first lateral plates 320a of the injection molded first cover 300.

Figure 5:
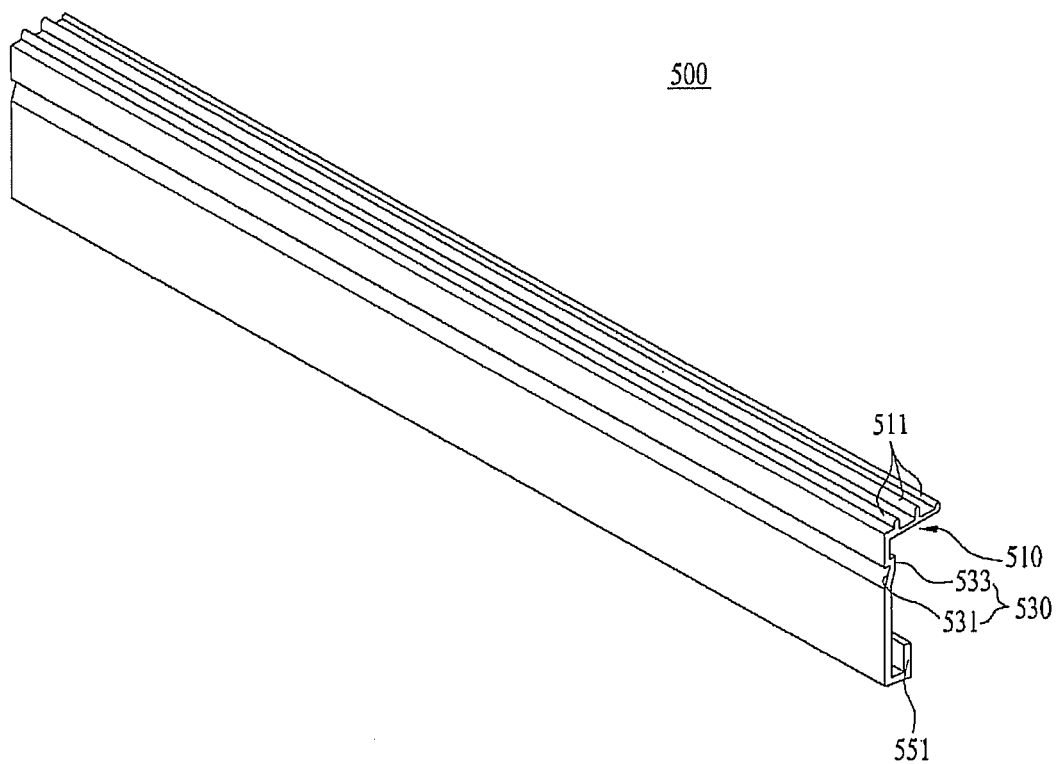
FIG. 5 is a perspective view illustrating a second cover of FIG. 1A.

FIG. 5 is a perspective view illustrating the second cover of FIG. 1A.

The second cover 500 as illustrated in FIG. 5 may be coupled to the first cover 300 and may support the light source module 100 as illustrated in FIGS. 1A to 1C.

The second cover 500 may include a fourth coupling portion 551 for coupling with the first cover 300 and a fifth coupling portion 530 for coupling with the third cover 600.

The fourth coupling portion 551 may be located at a lower surface of the second cover 500, and the fifth coupling portion 530 may be located at a lateral surface of the second cover 500.

An upper portion 510 of the second cover 500 may be bent in the first direction (the Y-direction of FIG. 2A).

A plurality of protrusions 511 may be formed at an upper surface of the upper portion 510 of the second cover 500. As illustrated in FIGS. 1A to 1C, the reflector 200 may be disposed under a lower surface of the upper portion 510.

The optical member 400, as illustrated in FIGS. 1A to 1C, may come into contact with and be supported by at least any one of the protrusions 511 formed at the upper surface of the second cover 500.

Figure 6A:
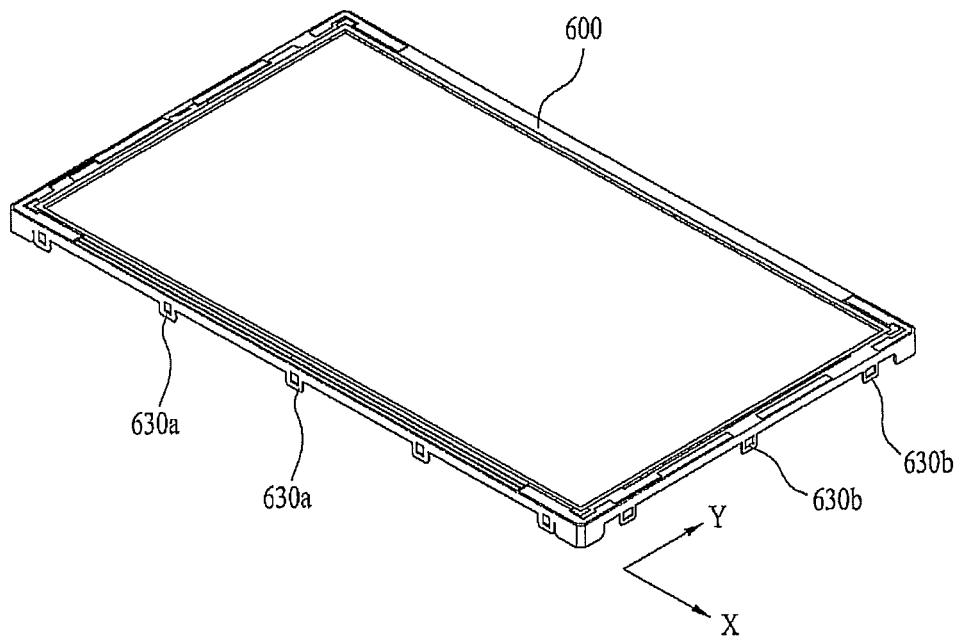
FIGS. 6A and 6B are perspective views illustrating a third cover of FIG. 1A.
Figure 6B:
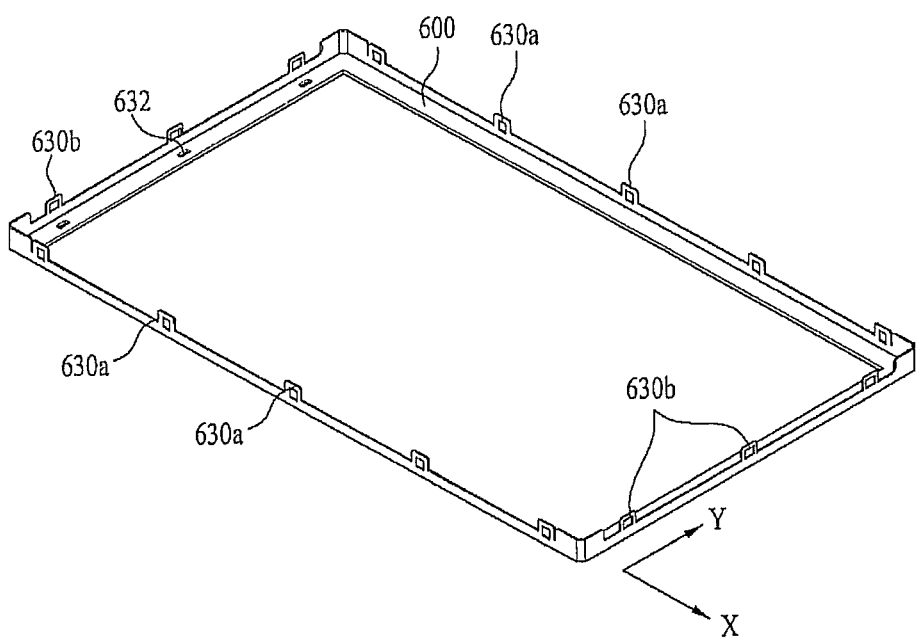

FIGS. 6A and 6B are perspective views illustrating the third cover of FIG. 1A, FIG. 6A being a front perspective view and FIG. 6B being a rear perspective view.

As illustrated in FIGS. 6A and 6B, the third cover 600 may include sixth and seventh coupling portions 630a and 630b for coupling with the first and second covers 300 and 500.

The sixth coupling portions 630a may be located at opposite longitudinal sides of the third cover 600 so as to be spaced apart from one another in the second direction (the X-direction), and the seventh coupling portions 630b may be located at opposite transverse sides of the third cover 600 so as to be spaced apart from one another in the first direction (the Y-direction) perpendicular to the second direction.

The sixth coupling portions 630a may be coupled to the second cover 500, and the seventh coupling portions 630b may be coupled to the first cover 300.

The third cover 600 may further include eighth coupling portions 632 at a lower surface thereof. The eighth coupling portions 632 may be arranged in the first direction to correspond to the seventh coupling portions 630b in a one to one ratio.

The eighth coupling portions 632 may be coupled to the second coupling portions 332 of the first cover 300.

In consideration of the fact that the second coupling portions 332 protrude upward from the first cover 300 so as to be coupled to the optical member 400, the eighth coupling portions 632 of the third cover 600, which correspond to the second coupling portions 332, may take the form of recesses.

Figure 7A:
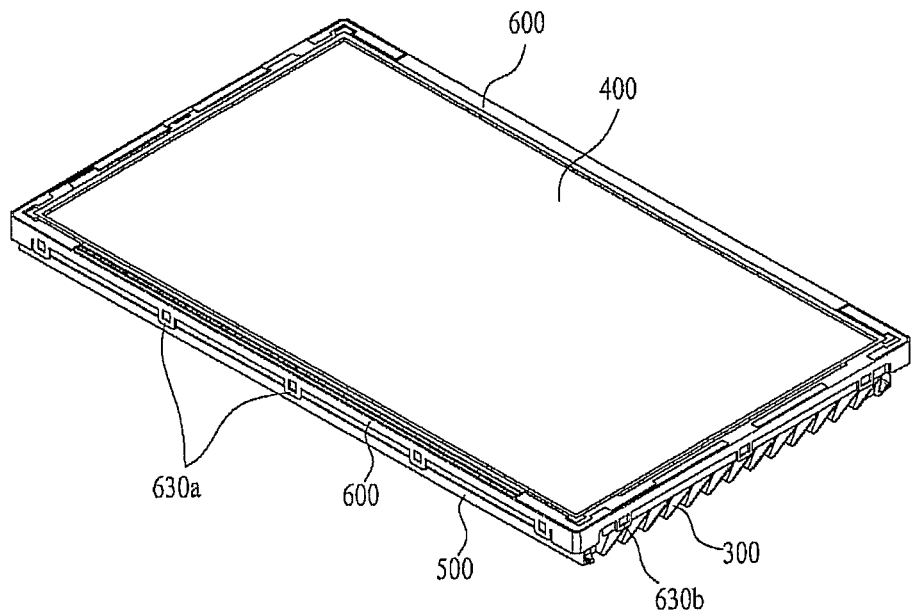
FIGS. 7A and 7B are perspective views illustrating the third cover coupled to the first and second covers.
Figure 7B:
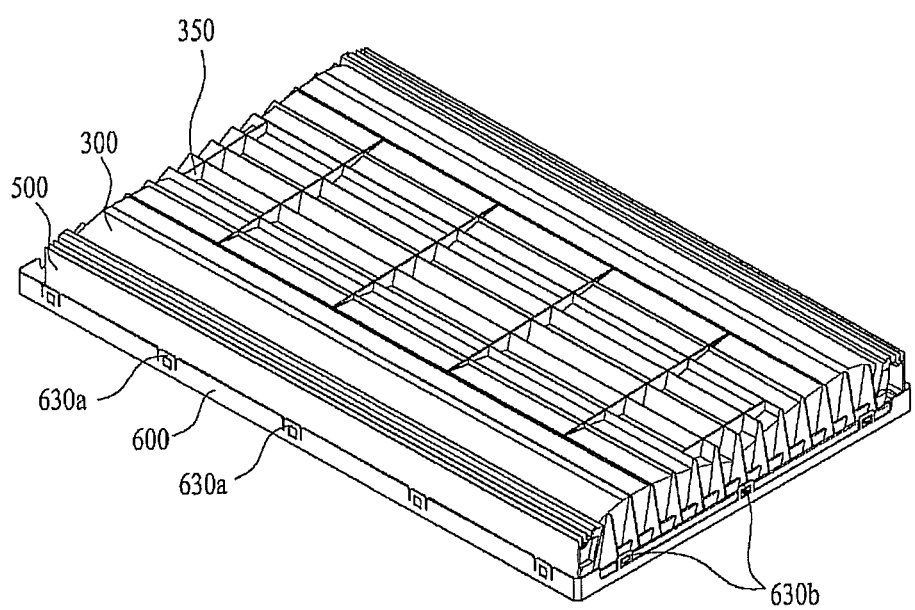

FIGS. 7A and 7B are perspective views illustrating the third cover coupled to the first and second covers, FIG. 7A being a front perspective view and FIG. 7B being a rear perspective view.

As illustrated in FIGS. 7A and 7B, the third cover 600 may be coupled to the second cover 500 by means of the sixth coupling portions 630a located at either longitudinal side of the third cover 600 and may be coupled to the first cover 300 by means of the seventh coupling portions 630b.

Figure 8A:
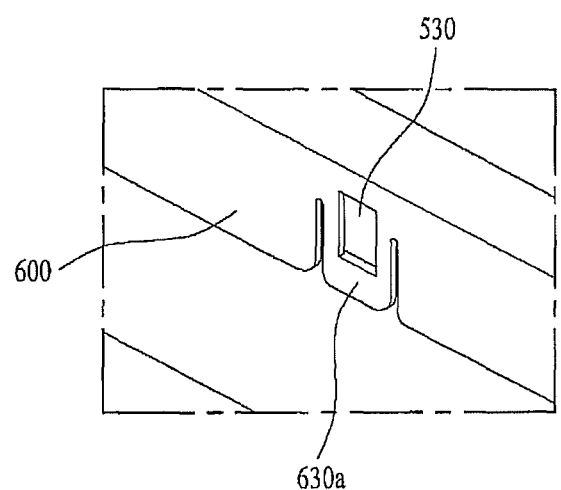
FIGS. 8A and 8B are views illustrating coupling portions of the second cover and the third cover in detail.
Figure 8B:
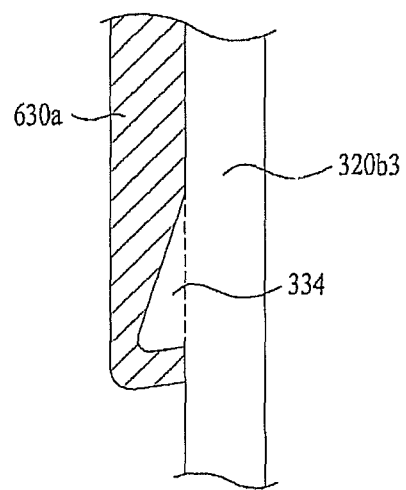

FIGS. 8A and 8B are views illustrating the coupling portions of the second cover and the third cover in detail, FIG. 8A being a partial view, and FIG. 8B being a sectional view.

As illustrated in FIGS. 8A and 8B, the sixth coupling portion 630a is configured to protrude downward from the third cover 600 and is centrally disposed with a hole.

The seventh coupling portion 630b of the third cover 600 may be coupled to the corresponding third coupling portion 334 formed at the second lateral plate 320b of the first cover 300.

The third coupling portion 334 may be configured to protrude forward from the outer surface 320b3 of the second lateral plate 320b.

As described above, the embodiments enable fabrication of a simplified configuration of a cover frame suitable for an air guide, thereby providing light weight design, mass-production and uniform luminance.

Accordingly, the backlight unit may achieve enhanced reliability and economic efficiency.

Figure 9:
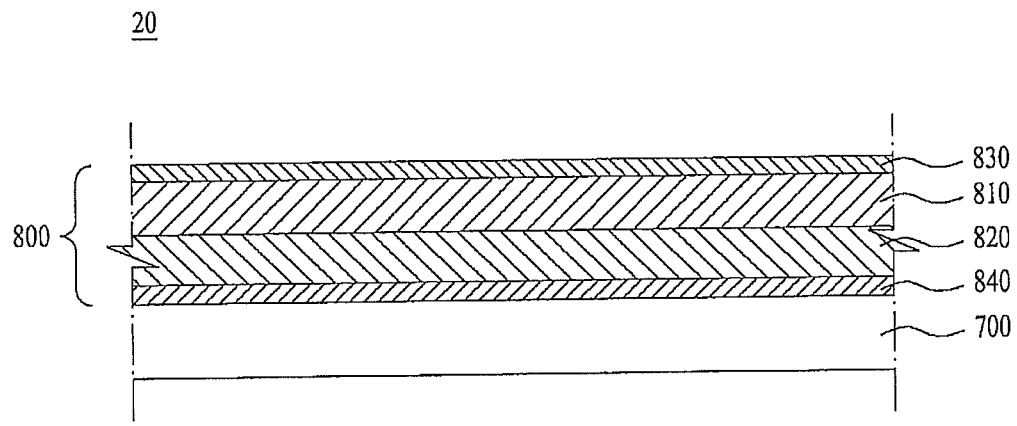
FIG. 9 is a view illustrating a display module having a backlight unit according to an embodiment.

FIG. 9 is a view illustrating a display module having a backlight unit according to an embodiment.

As illustrated in FIG. 9, the display module 20 may include a display panel 800 and a backlight unit 700.

The display panel 800 may include a color filter substrate 810 and a Thin Film Transistor (TFT) substrate 820, which are bonded to face each other with a uniform cell gap therebetween. A liquid crystal layer (not shown) may be interposed between the two substrates 810 and 820.

The color filter substrate 810 includes a plurality of pixels each consisting of red (R), green (G) and blue (B) sub pixels, and may produce red, green and blue images when light is applied thereto.

Although the pixels may consist of red, green and blue sub pixels, the disclosure is not limited thereto and a single pixel may consist of red, green, blue and white (W) sub pixels.

The TFT substrate 820 may be disposed with switching devices to switch pixel electrodes (not shown).

For example, a common electrode (not shown) and pixel electrode may vary the arrangement of molecules in a liquid crystal layer according to a predetermined voltage applied from an external power source, Specifically, the liquid crystal layer includes a plurality of liquid crystal molecules, and the liquid crystal molecules may be differently arranged according to a voltage difference generated between the pixel electrode and the common electrode.

Thereby, introduction of light from the backlight unit 700 to the color filter substrate 810 may vary based on the molecular arrangement of the liquid crystal layer.

An upper polarizing plate 830 and a lower polarizing plate 840 may respectively define an upper surface and a lower surface of the display panel 800. More specifically, the upper polarizing plate 830 may be disposed on an upper surface of the color filter substrate 810 and the lower polarizing plate 840 may be disposed under a lower surface of the TFT substrate 820.

Although not illustrated, gate and data drivers may be disposed at a lateral surface of the display panel 800, to generate drive signals required to drive the panel 800.

As illustrated in FIG. 9, the display module 20 may be constructed in such a way that the backlight unit 700 comes into close contact with the display panel 800.

More specifically, the backlight unit 700 may be fixedly attached to the lower surface of the display panel 800, more particularly, to the lower polarizing plate 840. To this end, an adhesive layer (not shown) may be interposed between the lower polarizing plate 840 and the backlight unit 700.

When the backlight unit 700 comes into close contact with the display panel 800, the thickness of the entire display apparatus may be reduced, resulting in enhanced external appearance. Moreover, an additional structure of securing the backlight unit 700 may be omitted, which may simplify the configuration and fabrication of the display apparatus.

In addition, since there exists no space between the backlight unit 700 and the display panel 800, it is possible to prevent malfunction of the display apparatus or deterioration in the quality of images being displayed caused when foreign substances invade a gap between the backlight unit 700 and the display panel 800.

Figure 10:
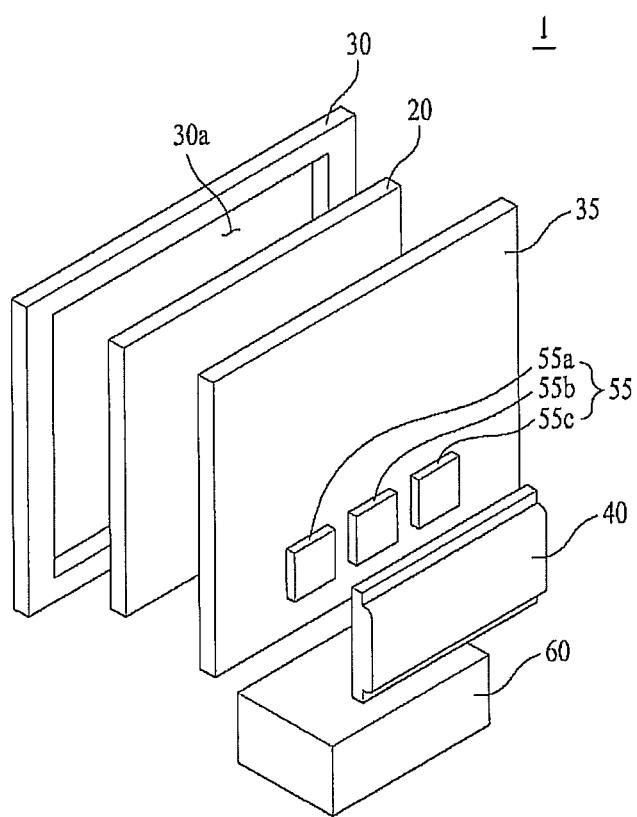
FIGS. 10 and 11 are views illustrating a display apparatus according to an embodiment.
Figure 11:
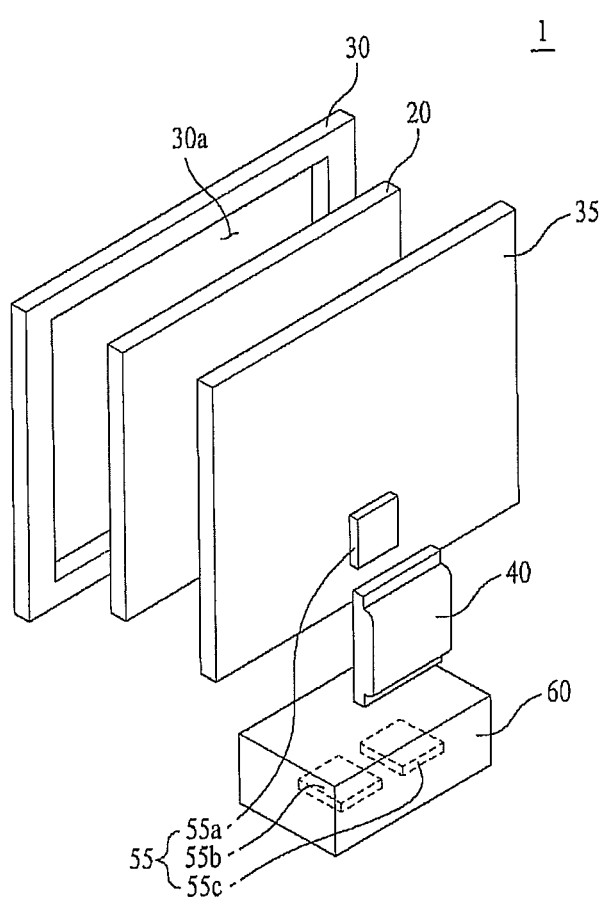

FIGS. 10 and 11 are views illustrating a display apparatus according to an embodiment.

Referring to FIG. 10, the display apparatus 1 may include the display module 20, a front cover 30 configured to surround the display module 20, a back cover 35, a drive unit 55 disposed at the back cover 35, and a drive unit cover 40 to enclose the drive unit 55.

The front cover 30 may include a transparent front panel (not shown) to transmit light. The front cover 30 serves to protect the display module 20 spaced apart therefrom by a predetermined distance and transmit light emitted from the display module 20, allowing an image displayed on the display module 20 to be seen from the outside.

Although the embodiment illustrates the front cover 30 as having a window 30a, the front cover may be replaced with a flat panel having no window. In this case, the front cover 30 may be formed by injection molding a transparent light transmitting material, such as e.g., plastic.

When the front cover 30 takes the form of the flat panel, the front cover may have a frameless configuration.

The back cover 35 may be coupled to the front cover 30, thereby acting to protect the display module 20.

The drive unit 55 may be attached to a surface of the back cover 35.

The drive unit 55 may include a drive controller 55a, a main board 55b and a power supply 55c.

The drive controller 55a may be a timing controller. The drive controller 55a serves to adjust an operation timing of each driver IC of the display module 20. The main board 55b may serve to transmit V-sync, H-sync and R, G and B resolution signals to the timing controller. The power supply 55c supplies power to the display module 20.

The drive unit 55 may be attached to the back cover 35 and enclosed by the drive unit cover 40.

The back cover 35 has a plurality of holes, through which the display module 20 may be connected to the drive unit 55. Also, a stand 60 to support the display apparatus 1 may be disposed.

In an alternative embodiment, as illustrated in FIG. 11, the drive controller 55a of the drive unit 55 may be disposed at the back cover 35, whereas the main board 55b and the power supply 55c may be disposed in the stand 60.

The drive unit cover 40 may be configured to enclose only the drive unit 55 disposed at the back cover 35.

Although the present embodiment illustrates the main board 55b and the power supply 55c as being disposed separately, they may be integrated, without being limited thereto.

In other embodiments, a display device, an indicating device, and a lighting system including the first and second reflectors and the light source module as described in the above embodiments may be realized. For example, the lighting system may be a lamp or a street lamp.

The lighting system may serve as a light including a plurality of LEDs, and in particular, may take the form of a built-in light (e.g., an LED down light) that is embedded in the ceiling or wall of a building such that an opening of a shade is exposed to the outside.

As is apparent from the above description, according to the embodiments, fabrication of a simplified configuration of a cover frame suitable for an air guide is possible, which may provide light weight design, mass-production and uniform luminance.

Accordingly, the backlight unit may achieve enhanced reliability and economic efficiency.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A backlight unit comprising:
   first and second reflectors;
   at least one light source module disposed between the first reflector and the second reflector;

an optical member disposed at a predetermined distance from the second reflector;
a first cover configured to come into contact with the second reflector and the optical member;
wherein the first cover includes:
a bottom plate;
first lateral plate disposed to face each other with respect to a first direction of the bottom plate;
second lateral plate disposed to face each other in a second direction perpendicular to the first direction; and
a plurality of pins arranged on an upper surface of the bottom plate and a lower surface of each pin has a greater area than an upper surface of the pin.

2. The backlight unit according to claim 1, wherein the first cover further includes a first coupling portion disposed at a lower portion of each first lateral plate so as to be coupled to the second cover.

3. The backlight unit according to claim 2, wherein the first coupling portion includes a plurality of ridge lines protruding from a lower surface of the first lateral plate.

4. The backlight unit according to claim 3, wherein the ridge lines are spaced apart from one another so as to be disposed in the first direction.

5. The backlight unit according to claim 1, wherein the first cover further includes a second coupling portion disposed at an upper portion of each second lateral plate so as to be coupled to the optical member, and a third coupling portion disposed at a lateral portion of each second lateral plate so as to be coupled to the third cover.

6. The backlight unit according to claim 5, wherein the second coupling portion and the third coupling portion are arranged to correspond to each other in a one to one ratio.

7. The backlight unit according to claim 5, wherein the second coupling portion protrudes from an upper surface of the second lateral plate, and the third coupling portion protrudes from a lateral surface of the second lateral plate.

8. The backlight unit according to claim 5, further comprising a third reflector disposed on an inner surface of each second lateral plate.

9. The backlight unit according to claim 5, wherein a plurality of ribs is disposed on an outer surface of each second lateral plate.

10. The backlight unit according to claim 5, wherein a height of the second lateral plates is greater than a height of the first lateral plates.

11. The backlight unit according to claim 1, further comprising a second cover coupled to the first cover to support the light source module; and a third cover coupled to both the first and second covers.

12. The backlight unit according to claim 1, wherein a plurality of ribs is arranged on a lower surface of the bottom plate.

13. The backlight unit according to claim 1, wherein an air guide is defined in a space between a bottom surface of the first cover and the optical member.

14. A backlight unit comprising:
first and second reflectors;
at least one light source module disposed between the first reflector and the second reflector;
an optical member disposed at a predetermined distance from the second reflector;
a first cover configured to come into contact with the second reflector and the optical member;
wherein the first cover includes:
a bottom plate;
first lateral plate disposed to face each other with respect to a first direction of the bottom plate;
second lateral plate disposed to face each other in a second direction perpendicular to the first direction; and
a plurality of ribs is disposed on an outer surface of each second lateral plate.

15. The backlight unit according to claim 14, wherein the second reflector is disposed above the bottom plate and the first lateral plates.

16. The backlight unit according to claim 1, wherein the first cover includes a first coupling portion disposed at a lower portion of each first lateral plate so as to be coupled to the second cover, a second coupling portion disposed at an upper portion of each second lateral plate so as to be coupled to the optical member, and a third coupling portion disposed at a lateral portion of each second lateral plate so as to be coupled to the third cover.

17. The backlight unit according to claim 16, wherein the second cover includes a fourth coupling portion disposed at a lower surface of the second cover so as to be coupled to the first cover, and a fifth coupling portion disposed at a lateral surface of the second cover so as to be coupled to the third cover.

18. The backlight unit according to claim 16, wherein the third cover includes sixth coupling portions disposed at opposite sides of the third cover so as be spaced apart from one another in the first direction, and seventh coupling portions disposed at opposite sides of the third cover so as to be spaced apart from one another in the second direction perpendicular to the first direction, wherein the sixth coupling portions are coupled to the second cover, and the seventh coupling portions are coupled to the first cover.

19. The backlight unit according to claim 18, wherein the third cover further includes eighth coupling portions arranged at a lower surface of the third cover to correspond to the seventh coupling portions in a one to one ratio, the eighth coupling portions being coupled to the first cover.

20. A backlight unit comprising:
first and second reflectors;
at least one light source module disposed between the first reflector and the second reflector;
an optical member disposed at a predetermined distance from the second reflector;
a first cover configured to come into contact with the second reflector and the optical member;
a second cover coupled to the first cover to support the light source module; and
a third cover coupled to both the first and second covers,
wherein the first cover includes:
a bottom plate;
first lateral plate disposed to face each other with respect to a first direction of the bottom plate; and
second lateral plate disposed to face each other in a second direction perpendicular to the first direction,
wherein the bottom plate includes at least one inclined surface, and the at least one inclined surface of the bottom plate includes a plurality of inclined surfaces arranged adjacent to each other about at least one inflection point and having different curvatures.

* * * * *